United States Patent [19]

Vowinkel et al.

[11] Patent Number: 5,300,361
[45] Date of Patent: Apr. 5, 1994

[54] PROCESS FOR THE PRODUCTION OF A POLYPROPYLENE COMPOSITE

[75] Inventors: Hans Vowinkel, Flörsheim am Main; Franz Gübitz, Kelkheim/Taunus; Rolf Orth, Flörsheim am Main, all of Fed. Rep. of Germany

[73] Assignee: Hoechst Aktiengesellschaft, Frankfurt am Main, Fed. Rep. of Germany

[21] Appl. No.: 938,042

[22] PCT Filed: May 13, 1991

[86] PCT No.: PCT/EP91/00884

§ 371 Date: Nov. 12, 1992

§ 102(e) Date: Nov. 12, 1992

[87] PCT Pub. No.: WO91/17882

PCT Pub. Date: Nov. 28, 1991

[30] Foreign Application Priority Data

May 16, 1990 [DE] Fed. Rep. of Germany ....... 4015739

[51] Int. Cl.⁵ ............................................. B32B 31/26

[52] U.S. Cl. ................................ 428/304.4; 428/318.4; 428/318.6; 428/411.1; 156/82; 156/242; 156/245; 156/322

[58] Field of Search ................. 156/82, 242, 245, 322; 428/73, 116, 119, 304.4, 318.4, 318.6, 411.1

[56] References Cited

U.S. PATENT DOCUMENTS 4,826,552  5/1989  Breitscheidel et al. ............. 156/322
4,854,993  8/1989  Celia ................................... 156/322
4,882,002  11/1989  Ando et al. ......................... 156/322

Primary Examiner—Caleb Weston

[57] ABSTRACT

In composites comprising at least one solid base layer of a propylene polymer and a foam layer likewise of a propylene polymer, these layers can be bonded by softening only the side of the base layer facing the foam layer and optionally provided with relief structures by warming, and pressing the base layer and foam layer together, giving a very strong bond.

2 Claims, No Drawings

PROCESS FOR THE PRODUCTION OF A POLYPROPYLENE COMPOSITE

The invention relates to a process for the production of a polypropylene composite which comprises a base layer, a foam layer and a top layer.

The disposal and recycling of plastic parts, preferably in the automotive sector, has become a topical subject. Many concepts have already been developed for the reprocessing and recycling of plastic waste. However, problems are caused in the recycling of composite systems in which the individual components comprise different polymers. In this respect, designs comprising entirely the same basic material are therefore desired.

The uses in question here are primarily those in which shock-absorbing, sound-insulating, heat-insulating or safety objectives must be achieved. The following are some examples from the automotive sector: dashboards, bumpers, headrests, door side panels, armrests, and others.

For these applications, combinations of the following materials have usually been used hitherto: acrylonitrile-butadiene-styrene polymers, polyphenylene oxide blends, polyvinyl chloride, polyurethane, polypropylene, polymethyl methacrylate (ABS, PPO, blends, PVC, PU, PP and PMMA), and a number of other materials, such as textiles or wood fiber molding materials.

Changeover to individual components based on the same material, for example in the case of base (insert)-foam decorative film composite, requires new methods in bonding technology.

It has been found that a strong and durable bond between the base layer and the foam layer can be achieved simply by welding.

The invention also relates to a process for the production of a polypropylene composite comprising at least one solid base layer and a foam layer by bonding the two layers, which comprises softening exclusively the surface of the base layer facing the foam layer by warming and then joining the base layer and the foam layer under a pressure of from 0.1 to 0.4 N/mm$^2$.

The invention furthermore relates to the composite produced by this process.

The process according to the invention is used primarily for polypropylene composites which comprise at least one solid base layer and a foam layer bonded thereto.

The base layer comprises, for example, a propylene polymer made from a) from 100 to 50 parts by weight, preferably from 90 to 60 parts by weight, of isotactic polypropylene or copolymers of propylene containing up to 25 parts by weight of ethylene, b) from 0 to 40 parts by weight, preferably from 10 to 20 parts by weight, of rubber-like, polypropylene-compatible copolymers, and c) from 0 to 50 parts by weight, preferably from 20 to 40 parts by weight, of reinforcing fillers.

However, the propylene polymer may also be a block copolymer containing from 1 to 40% by weight of copolymerized ethylene.

Preference is given to the use of a homopolymer or copolymer of propylene with a melt flow index MFI 230/5 in accordance with DIN 53 735 of from 5 to 25 g/10 min.

Particularly suitable rubber-like copolymers are amorphous copolymers made from 30–70% by weight of ethylene and 70–30% by weight of propylene, terpolymers made from ethylene, propylene and up to 5% by weight of dienes, preferably ethylidenenorbornene or 1,4-hexadiene, copolymers made from ethylene and from 10 to 45% by weight of vinyl acetate, or block copolymers made from styrene and butadiene or styrene and isoprene which have polystyrene blocks at the two ends of the molecule.

Preferred reinforcing fillers are talc, chalk, sawdust, glass fibers or glass beads; adequate softening of the surface of the base layer must still be possible.

The foam layer likewise comprises a propylene polymer, namely polypropylene or a propylene copolymer.

The foam layer may preferably be produced as a particulate foam from foamed beads or by extrusion. The density is usually between 10 and 100 g/l.

Suitable blowing agents for the foaming are, inter alia, gaseous, such as, for example, fluorinated hydrocarbons, or solid or liquid organic blowing agents having a decomposition or boiling point below the melting point of the polyolefin.

In addition to the blowing agent, conventional additives, such as light and thermal stabilisers, pigments, lubricants, antistatics, flameproofing agents and the like may be added to the polyolefin. It is likewise possible to add crosslinking agents. In addition, the polyolefin used may also contain fillers in the customary and necessary amounts, for example calcium carbonate, chalk, talc, glass beads, silicates of magnesium and/or aluminum, alumina, carbon black or sawdust.

If the foam layer comprises particulate foam, the final shaping thereof can be achieved, for example, by filling a mold with blowing agent-free, prefoamed beads while passing in superheated steam. If the foam layer is produced by extrusion, the final shaping can be carried out with the action of temperature, for example by compression molding or thermoforming.

The base layer can be produced by various processes, for example by injection molding (preferred process), extrusion or calendering.

In order to bond the base layer to the foam layer, only the surface of the base layer facing the foam layer is softened by warming. This can take place by means of a heating element by conductive heating at normal or high temperature or without contact by radiant heat. The choice of the temperature of the heating element and of the heating time depends on the flow behavior of the polymer, the thickness of the base layer and on machine factors. Besides warming by a heating element, a hot gas can also be employed for softening the joint surface.

It is advantageous for application and softening for the side of the base facing the foam layer to have relief structures. These may be, for example, ribs, ridges, knobs or other relief structures. For economic reasons, sheet-like structures of this type can be softened more rapidly than a smooth surface. At the same time, profiles of this type reduce the tendency of the base layer to warp.

Immediately after the softening of the surface of the base layer, the base layer and the foam layer are joined under pressure. During this operation, the softened material of the surface of the base layer partially penetrates into the foam layer and thus provides a strong bond. The pressure is advantageously from 0.1 to 0.4 N/mm$^2$.

The joining of the base layer and foam layer can be carried out on conventional welding machines. The bond is so strong that it is generally the foam structure that fractures in tensile and flexural testing.

The examples below are intended to illustrate the invention.

EXAMPLE 1

A base part comprising a PP copolymer reinforced with 30% of talc and having ribs on one side was bonded to a foam layer comprising PP particulate foam (density 50 g/l) by softening the front faces of the relief structures to a melt layer depth of 2-3 mm on a heating element kept at about 250° C., and subsequently brought into contact with the foam layer at a contact pressure of about 0.1-0.2 N/mm².

EXAMPLE 2

Using the same procedure as in Example 1, the relief structures of the base layer were softened to a melt layer depth of 2-3 mm at extremely high heating element temperatures (selected range: 300°-400° C.) and subsequently joined to the foam layer at a contact pressure of 0.1-0.2 N/mm. The warming operation was particularly economical due to the extremely short warm-up times.

EXAMPLE 3

The relief structures of the base layer were softened by radiant heating and bonded to the foam layer under contact pressure. The air gap between the radiation source and the joint surface was between 0.5 and 1 mm. The necessary melt layer depth of 2-3 mm was achieved within 8-15 seconds at the heating element temperature of 500°-550° C.

Flexural and tensile loading of the composite produced generally caused fractures in the foam structure.

Further experiments under identical conditions, but with base layers comprising unreinforced PP homopolymer, PP copolymer and with PP homopolymer +30% of chemically coupled glass fibers gave the same results.

We claim:

1. A process for the production of a composite comprising a solid base layer produced by injection molding form a propylene polymer and a foam layer made form a propylene polymer, by bonding the two layers, which comprises softening exclusively the surface of the base layer facing the foam layer, said surface having relief structures thereon, by warming down to a melt layer depth of from 2 to 3 mm and then joining the base layer and the foam layer under a pressure of from 0.1 to 0.4 N/mm².

2. A composite comprising a solid base layer produced by injection molding from a propylene polymer ad a foam layer made from a propylene polymer, the composite being produced by bonding the two layers, exclusively the surface of the base layer facing the foam layer and provided with relief structures being softened by warming down to a melt layer depth of from 2 to 3 mm, and the base layer and foam layer then being joined under a pressure of from 0.1 to 0.4 N/mm².

* * * * *

UNITED STATES PATENT AND TRADEMARK OFFICE
CERTIFICATE OF CORRECTION

PATENT NO. : 5,300,361
DATED : April 5, 1994
INVENTOR(S) : Vowinkel et al

It is certified that error appears in the above-indentified patent and that said Letters Patent is hereby corrected as shown below:

In claim 1 at column 4, line 14, please change "form" (both occurrences) to --from--.

In claim 2 at column 4, line 24, please change "ad" to --and--.

Signed and Sealed this

Ninth Day of August, 1994

Attest:

BRUCE LEHMAN

Attesting Officer          Commissioner of Patents and Trademarks